US009075156B2

(12) United States Patent
Koeppe

(10) Patent No.: US 9,075,156 B2
(45) Date of Patent: Jul. 7, 2015

(54) LIGHT CURTAIN

(75) Inventor: Robert Koeppe, Linz (AT)

(73) Assignee: ISIQIRI INTERFACE TECHNOLOGIES GMBH (AT)

( * ) Notice: Subject to any disclaimer, the term of this patent is extended or adjusted under 35 U.S.C. 154(b) by 108 days.

(21) Appl. No.: 13/824,808

(22) PCT Filed: Sep. 28, 2011

(86) PCT No.: PCT/AT2011/000398
§ 371 (c)(1),
(2), (4) Date: Apr. 4, 2013

(87) PCT Pub. No.: WO2012/045101
PCT Pub. Date: Apr. 12, 2012

(65) Prior Publication Data
US 2013/0187033 A1    Jul. 25, 2013

(30) Foreign Application Priority Data
Oct. 6, 2010  (AT) ................. A 1667/2010

(51) Int. Cl.
G01V 8/26    (2006.01)
G01V 8/16    (2006.01)
G02B 26/10   (2006.01)

(52) U.S. Cl.
CPC .. *G01V 8/26* (2013.01); *G01V 8/16* (2013.01); *G02B 26/10* (2013.01)

(58) Field of Classification Search
CPC ............. G01V 8/26; G01V 8/16; G02B 26/10
USPC ........................................... 250/221, 559.12
See application file for complete search history.

(56) References Cited

U.S. PATENT DOCUMENTS

| 4,106,218 | A | * | 8/1978 | Polstorff ................... 434/34 |
| 4,107,522 | A | | 8/1978 | Walter |
| 5,070,237 | A | | 12/1991 | Okuyama et al. |

(Continued)

FOREIGN PATENT DOCUMENTS

| AT | 507267 | 3/2010 |
| AT | 507702 | 7/2010 |

(Continued)

OTHER PUBLICATIONS

International Search Report for PCT/AT2011/000398, English translation attached to original, Both completed by the European Patent Office on May 30, 2012, All together 5 Pages.

*Primary Examiner* — Seung C Sohn
(74) *Attorney, Agent, or Firm* — Brooks Kushman P.C.

(57) ABSTRACT

A light curtain for the optical detection of shading objects in an area to be monitored, wherein the area to be monitored is repeatedly swept over by a collimated light beam of variable direction. The power of the light crossing the area is measured, shadow boundaries, position and size of a shading object are deduced by an evaluating control from the temporal profile of the measured power with knowledge of the temporal profile of the direction of the light beam. An optical detector area embodied as a planar optical waveguide is arranged along the edge of the area to be monitored, photoluminescent particles being integrated into said optical detector area and one or more photoelectric sensors being fitted to the optical detector area. Using the light curtain, shading objects can be detected with very good resolution, the light curtain can be robust and can have a low production cost.

18 Claims, 4 Drawing Sheets

(56) References Cited

U.S. PATENT DOCUMENTS

Figure 1:
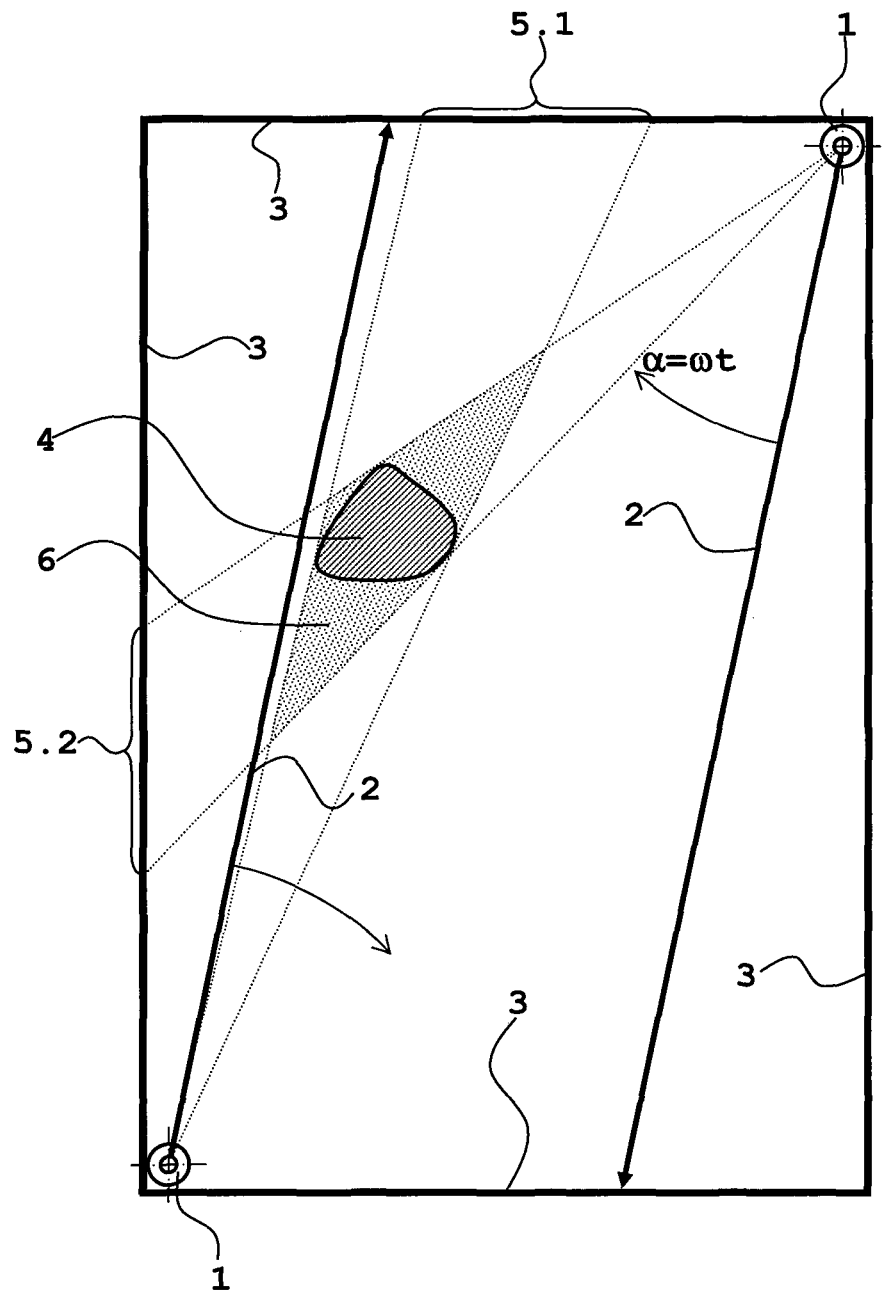

| | | | |
|---|---|---|---|
| 5,132,530 A | 7/1992 | Groh et al. | |
| 6,333,512 B1 * | 12/2001 | Wirthlin | 250/577 |
| 6,771,265 B1 * | 8/2004 | Shimono | 345/426 |
| 7,379,194 B2 * | 5/2008 | Ryan et al. | 356/625 |
| 2004/0227110 A1 | 11/2004 | Luxem et al. | |
| 2008/0122803 A1 * | 5/2008 | Izadi et al. | 345/175 |
| 2011/0115750 A1 | 5/2011 | Ebner et al. | |
| 2011/0266423 A1 | 11/2011 | Koeppe et al. | |

FOREIGN PATENT DOCUMENTS

| | | |
|---|---|---|
| DE | 2550653 | 5/1977 |
| DE | 3441498 | 5/1986 |
| DE | 102005040351 | 3/2007 |
| EP | 0361374 | 4/1990 |
| EP | 1267143 | 12/2002 |

* cited by examiner

LIGHT CURTAIN

CROSS-REFERENCE TO RELATED APPLICATION

This application is the U.S. national phase of PCT App. No. PCT/AT2011/000398 filed on 28 Sep. 2011, which claims priority to AT Patent Application No. A 1667/2010 filed on 6 Oct. 2010, the disclosures of which are incorporated in their entirety by reference herein.

A light curtain in the sense of this description is an optical monitoring device in which the principle of the light barrier is expanded from a linear monitoring area to a planar monitoring area.

Light curtains are formed in the simplest case by juxtaposition of light barriers aligned parallel to one another. A large number of light sensors and of light sources are required for the reliable detection of an object, and also for good detection of its position in the monitored area. In some cases, use is made of light sources in the case of which the cross sectional area of the emitted light beam approximately takes the shape of a straight line. Given that this line is aligned parallel to the alignment of the row formed by juxtaposition of light sensors, satisfaction can be achieved with a smaller number of light sources than of light sensors.

EP 0 361 374 A2 proposes forming a light detector by having fluorescent radiation, which is produced in a transparent plastic doped with an organic fluorescent dye upon incidence of external light, guided further to a photosensitive semiconductor element by means of optical waveguides which are likewise doped with a fluorescent dye. It is possible therefore to form large-area detector elements more cheaply than would be possible with photosensitive semiconductor elements on the basis of conventional semiconductor materials such as, typically, silicon.

In accordance with DE 34 41 498 C2, strips of a transparent material such as glass or clear plastic that are doped with fluorescent material are connected at one end to a photodiode and arranged next to one another so as to form a relatively large detector surface within which it is possible to measure individually for partial surfaces whether they are struck by light or not.

AT 507267 A1 and AT 507702 A2 describe optical detector surfaces and applications for this purpose as control surfaces for data processing systems. In this case, the optical detector surfaces are constructed from one or more planar optical waveguides on which there is respectively fitted at least one photoelectric sensor of very small area by comparison therewith, a layer of the optical waveguide having photoluminescent properties. The radiation of a light point impinging on the detector surface is converted by photoluminescence into light of longer wavelength that propagates in the planar optical waveguide and in the process is attenuated with increasing distance from the light point, decoupled from the optical waveguide at the photoelectric sensors, and detected. Detector surfaces of this type can be flexible and handy, are cost effective per area, and are well suited for quick signal processing of light signals. Because account is taken of the attenuation of the light signal propagating in the waveguide, mathematical evaluation methods can be used to provide good spatial resolution when detecting the place of impingement of a light point even given large detector surfaces with few tapping points. Application to a light curtain is not envisaged.

DE 10 2005 040 351 B4 describes a detector in the case of which there is applied to a planar, light-conducting substrate such as a glass pane a fluorescent material layer which absorbs in the visible spectral region scarcely to not at all and converts irradiated UV light into light that is routed in the substrate even to the edge regions thereof. Fitted on the edge regions of the substrate are radiation sensors which are optically coupled thereto and convert the incoming light power from the substrate into an electrical signal. Shading of the light otherwise irradiated prompts a variation in the electrical signal. As a very inconspicuous access monitoring system, the detector can be used for the space lying between light source and detector surface—which can be a glass pane that is present in any case. However, no more accurate position can be detected.

A light curtain for monitoring a room is described, inter alia, in DE 2550653 B2, a single, so-called rotary light source being applied. In this case, a single light source emits a light beam, although the light source—or a mirror onto which the light source shines—is rotated such that the light beam sweeps an area of the room at a particular rate. At the strip of the walls struck by the light beam when there is no shading object located in the room, the walls are provided with reflectors, specifically with retroreflectors or plane mirrors, and so the light beam is retroreflected either directly or indirectly to the light source, for example. A light sensor is also located in the near zone of the light source. When no light is retroreflected, this indicates that a shading object is located between the light source and the reflector area respectively otherwise illuminated. A single light source and a single light sensor can satisfactorily monitor a room. It is disadvantageous that monitoring can be "tricked" by reflective objects, that it is frequently scarcely possible to have good spatial resolution, and that the required reflecting strips on the walls of the room are frequently disturbing.

The object on which the invention is based consists in providing a light curtain that can be used to detect, in two dimensions within an area to be monitored, the fact of the presence of an object, as well as the size and position of the object, in real time. By contrast with known light curtains for this purpose, the light curtain to be newly provided is intended to function more robustly at a higher speed and with better spatial resolution and, nevertheless, to be capable of implementation by means of a smaller number of individual parts that are cost effective overall.

A mode of operation based on DE 2550653 B2 is the starting point for achieving the object. The area to be monitored is repeatedly swept by a collimated light beam (one "focused in parallel") from a light source, the power of the light that traverses the area being measured, and the time profile of the direction of the light beam being known. Shading of the light beam by an object located in the area to be monitored prompts a reduction in the measured light power. Given that the rotary angle of the causative light beam is also known at the instant of a reduction or increase in the measured light power, it follows that the angular coordinates of the shadow edges of a shading object located in the area to be monitored can be measured in the circumferential direction of the rotary movement of the light beam.

According to the invention, for the purpose of measuring the power of the light beam there is fitted at the edge of the area to be monitored an optical detector surface which generates an electrical signal as a function of the power of the impinging laser light, the detector surface being a planar optical waveguide in which photoluminescent particles are integrated and on which there are fitted one or more photoelectric sensors which are capable of decoupling light from the waveguide mode, and thereby of generating an electrical signal whose intensity is a function of the power of the decoupled light.

The detector surface described can be produced cost effectively as a large area or as a long strip, and it can be measured very quickly, and so it is possible to achieve a high spatial resolution. There is no need to measure the signals of many photoelectric sensors; instead it is sufficient to jointly measure the sum signal of all the photoelectric sensors for each detector, since the location of a shadow boundary is known in any case from knowledge of the direction of the associated light beam at the instant of a fluctuation of the sum signal.

Figure 2:
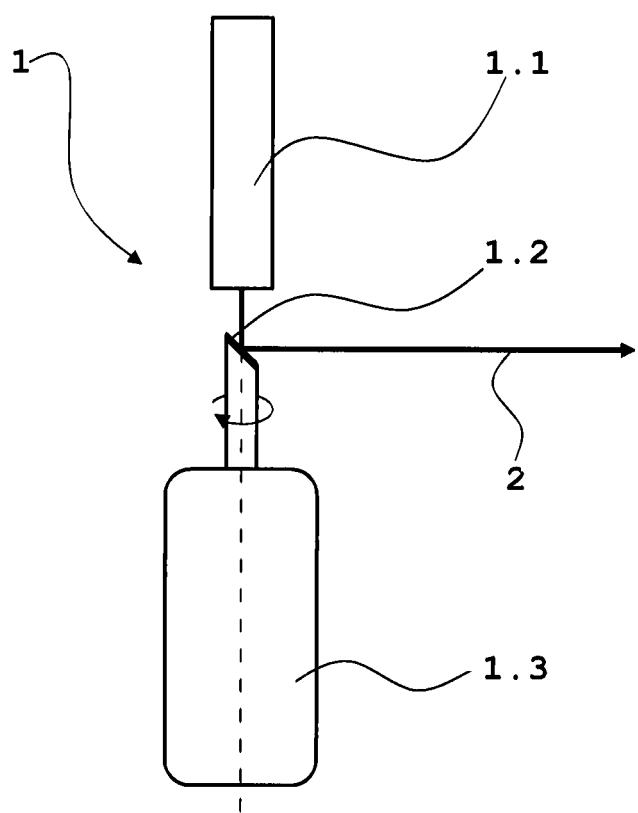
Figure 3:
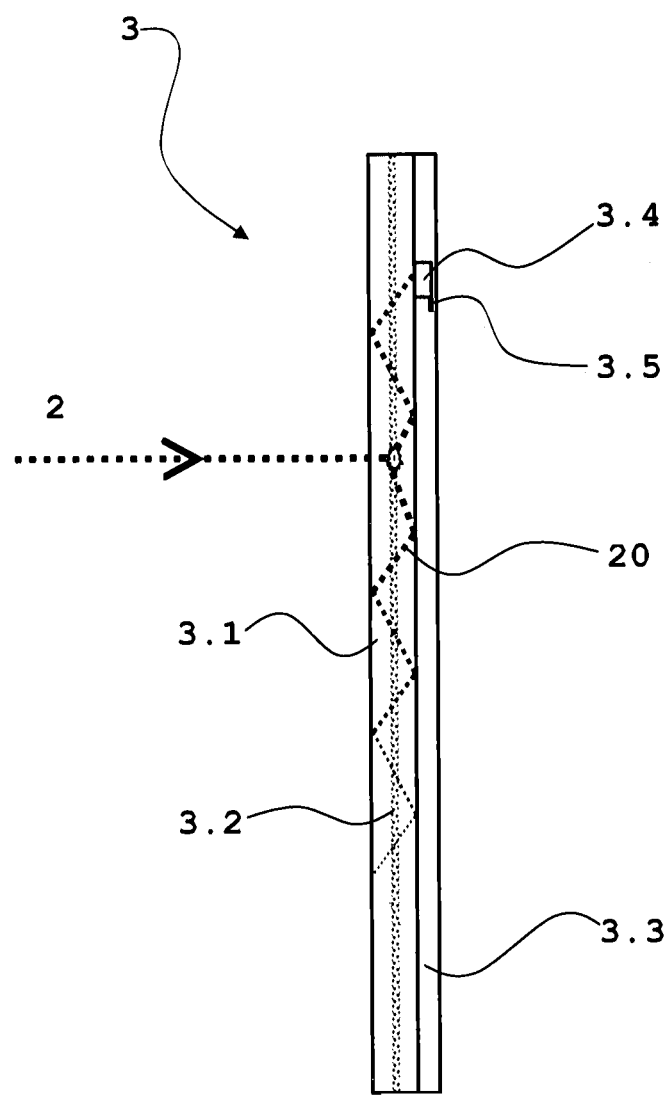
Figure 4:
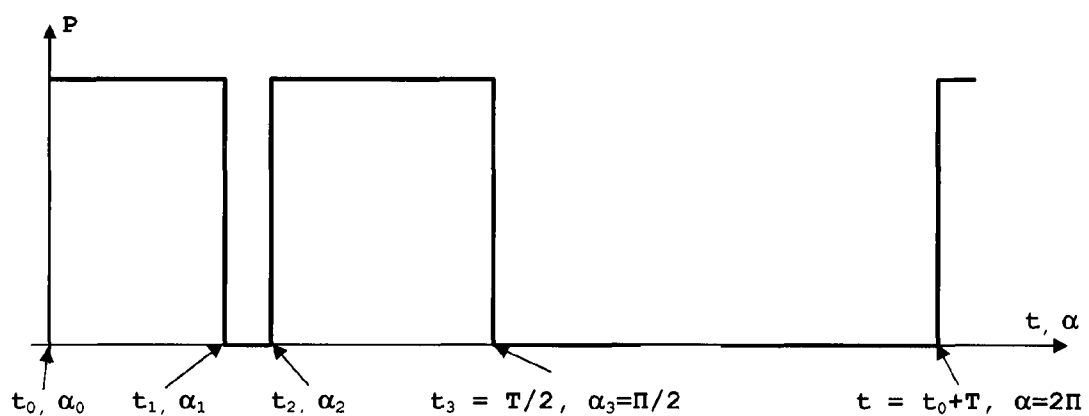

The invention is illustrated with the aid of three drawings, in which:

FIG. 1 shows a basic sketch of an inventive monitored area, from above,

FIG. 2 shows by way of example the essential elements of an exemplary light source as it can be applied for an inventive light curtain, FIG. 3 shows a cross sectional view of a detector surface that is designed as an elongated strip and can be applied for an inventive light curtain, and FIG. 4 shows the time profile of the result of the measurement of the light power originating from a light source.

In accordance with FIG. 1, there is respectively arranged at two corners, diagonally opposite one another, of a rectangular area to be monitored a light source 1 which respectively emits a collimated light beam 2, the direction of the light beam 2—as indicated by the curved arrows—being continuously rotated.

The boundaries of the area to be monitored are formed by four walls in the example sketched in FIG. 1. Fitted on each of the walls at the level of the area to be monitored is a respective strip 3 of a detector surface which can be used to measure the power (intensity integrated over the cross sectional area) of the light beam 2 striking it.

Arranged in the area to be monitored is an object 4 which respectively shades a subregion 5.1 or 5.2 of two detector surfaces 3 from a light source 1 in each case.

In accordance with FIG. 2, a laser light source 1.1 radiates a laser beam 2 vertically downward onto a mirror 1.2 that has its face arranged at the upper end of a vertically aligned shaft stub of an electric motor 1.3, and whose plane is inclined by 45° to the horizontal. By rotating the shaft of the electric motor 1.3 about its vertical axis, it follows that the mirror 1.2 also rotates about this vertical axis, and that the direction of the light beam 2 rotates likewise in a horizontal plane.

The exemplary detector surface 3, which is designed as an elongated strip and whose construction is sketched (not to scale) by way of example in FIG. 3, has two cover layers 3.1 approximately 0.1 mm thick and made from PET, between which there is laminated a layer 3.2 approximately 0.001 mm thick and made from a homogeneous mixture of the plastic polyvinyl alcohol and the dye Rhodamine 6G. The layer 3.2 is photo-luminescent. It is so thick that its absorption is above 80% for light of wavelength 532 nm impinging on it in a normal fashion. (The layer thickness required for this is best determined by experiment). When, owing to the light beam 2, a light spot with matching spectrum strikes the layer 3.2, it triggers photoluminescence on the dye particles of the layer 3.2. This produces diffusely scattered light of longer wavelength. In accordance with the known basic functional principle of optical wave guidance, it is propagated in the transparent layers 3.1 and also substantially remains in these layers, since it is retroreflected into the material of the layers 3.1 at the interfaces with the environment (air) or with the supportive layer 3.3 by virtue of the different refractive index.

Photodetectors 3.4 which are typically designed as silicon photodiodes and which can occupy a cross sectional area of approximately 2×2 mm$^2$ are fitted, by way of example, at a spacing of 5 cm from one another in the longitudinal direction of the detector surface, on that side of the PET layer 3.1 averted from the irradiation which is averted from the layer 3.2, such that they decouple light from the PET layer and couple it into their pn junction. An electrical signal is thereby generated at the pn junction in the form of a voltage or a current. Via a two-pole line 3.5 to a connection point, said electrical signal is routed to the detector surface 3 and fed to further processing. It suffices for the present application to take account of the sum signal of all the photodetectors 3.4 of a detector surface 3, rather than the individual signals of each photodetector 3.4. For example, it is therefore possible to connect in parallel all the photodetectors 3.4 of a detector surface that are formed by photodiodes, and to measure the common short circuit current. Said short circuit current is largely proportional to the light power decoupled from the waveguide mode at the individual pn junctions.

By way of example, FIG. 4 shows the sum signal of the light detection at two mutually adjacent boundary lines of the area to be monitored, the two boundary lines being illuminated from the same light source 1 (see FIG. 1). At the instant $t_0$, the light beam 2 radiates onto the start of the detector strip on the first wall; a power P is measured. At the instant $t_1$, the light beam reaches the shadow 4 (FIG. 1); the measured power drops to (approximately) zero. At the instant $t_2$, the light beam emerges from the shadow again; the measured power rises to the normal value again. At the instant $t_3$, the light beam reaches the end of the detector strip on the second wall, and thus reaches the end of the measurement range for the light beam from the one light source 1; the measured power drops to zero again and remains at this value until the cycle begins anew starting from the instant $t=t_0+T$. In this case, the time interval T is the period within which the direction of a light beam rotates further by one revolution.

In this case, precisely one angle α of the light beam in the area to be monitored is assigned to each instant t by the equation $α=ω·t$, ω being the angular velocity of the change in direction of the light beam 2. An evaluating control can thereby infer the exact positions of the shadow edges on the detector from the exact instants of the extinction and restitution of the signal. The position and also the approximate contours of the shaded object are thereby inferred in like fashion.

In a higher-level control, it is very sensible to assign the angle $α=0$ to each of the instants $t_0, t_0+T, t_0+2T \ldots$, and thus to recalibrate the angular measurement with each pass of the light beam. A sector within which the shading object must be located is therefore defined by the angles t1 and t2 which mark the boundaries of a shadow 5.1, 5.2 owing to the object 4.

Because a plurality of light sources 1 arranged at a spacing from one another (FIG. 1) are used, the shading object can be located more accurately, and its shape can be detected more accurately, since a plurality of such sectors must be located in the overlap region 6.

The mirror 1.2 can typically rotate at a fixed frequency of, for example, 1 kHz. The calibration of the angular position for each pass can, for example, be implemented by a light barrier which is interrupted or allowed through once per revolution by an object fitted on the motor 1.3, and in this case sends a signal to the evaluating control denoting a specific angular position of the motor 1.3, and thus of the mirror 1.2, and thus of the direction of the beam 2.

In order to avoid interference signals at detector surfaces owing to unrelated light sources 1, and to lengthen the service life of the laser light sources 1.1 that are used, it is advantageous to switch off the laser light sources 1.1 during the passage of the mirror 1.2 through an angular range on which no measurements are made in any case (in accordance with FIG. 4, between the instants $t_3$ and $t_0+T$).

When two light sources 1 are used and for a rotation frequency of 1 kHz, four angular values need to be read out and processed per millisecond for a shading object in order to delimit the position of the object and its approximate contour.

When the inventive sensor surfaces 3 are used, it is possible to operate usefully at a reading rate of 20 MHz from the sensor surfaces. Consequently, approximately 5000 measurement results accrue per light source and sweeping of the sensor surface region assigned to it. Depending on the size of the area to be monitored, the spatial resolution of the shadow detection therefore lies in the millimeter range down to the submillimeter range. Consequently, in a room of normal size (for example $20m^2$) it is even possible for a plurality of objects, whose size can lie in the centimeter range, to be detected and located individually without a problem.

The following may further be mentioned regarding modifications to the exemplary embodiment described:

It is not absolutely necessary to use an electro-mechanical apparatus to deflect the direction of the light beam. It is also possible to use electro-optical elements. Small changes in the angle of a light beam that are brought about thereby can be amplified via a curved mirror. By contrast with the use of an electric motor that has been described, it is thereby possible in some circumstances to improve the avoidance of noise and to lengthen the service life.

The same can be achieved by using a piezo effect to adjust the mirror, and additionally amplifying the deflection of the light beam by means of a curved mirror. It is also possible to combine electro-optical elements and piezo adjustment of a mirror and, if required, additionally to add a curved mirror downstream on the path of the light beam.

The light from the laser light sources 1.1 can be made to flash quickly at a fast frequency, and just this frequency can be filtered out of the measured signal. It is thereby possible to filter out background light effectively.

Particularly when the aim is to be able to detect the contours of a shading body more accurately than in the example sketched in FIG. 1, it makes sense to use more than two light sources 1 which need to be arranged at a spacing from one another, preferably at the edge of the area to be monitored. It is then important to bear in mind that in the case of indistinguishable light sources only one respective light source may shine onto a detector surface at an instant, since otherwise the signals coming from a detector surface are ambiguous in what they say about shadow boundaries. Consequently, a higher-level control should be used to switch off a light source whenever its light beam would be directed onto a detector surface onto which the light beam from a switched on light source is already being directed at that instant. Of course, it is also possible to use a plurality of shorter detector strips and to shine only a single light source onto each strip in any case. It would likewise be possible to use light sources in the case of which the intensity of the light fluctuates at a specific characteristic frequency for the individual light source. Which light source was causative can then be detected by frequency filtering from the detection results.

Movement of persons or objects on a floor area can thus be effectively monitored and recorded by arranging the area to be monitored by the light curtain horizontally over the floor area. The inventive light curtain is so robust and quick, and has a sufficiently high resolution, that, for example, it is also possible thereby to track the changes in the position of all football players on a football pitch during a football match.

Because of its speed and accuracy, the inventive light curtain can also be used very effectively for monitor tasks in and on machines. Likewise, as a position detector in a control loop for controlling the movement of an object it can detect and report the movements of the object to be controlled.

Not least, the inventive light curtain can also be used as an input device for a data processing system, in a fashion similar to a touchpad. To this end, it is necessary to arrange detector surfaces and light sources on a raised edging of an input field, which can be a screen or a projection surface, or else the rear of a transport projection surface. The position detection result can be interpreted and used like the cursor position of an input mouse in the data processing system. It is thus easily possible to locate the position of a plurality of touching fingers or pointing devices in real time; in this case, the function is independent of the state of the surface to be touched.

The invention claimed is:

1. A light curtain for the optical detection of shading objects in an area to be monitored, comprising a light source that emits a collimated light beam, said light beam being swept in the plane of an area to be monitored, an optical detector surface which is arranged along the edge of the area to be monitored and which can measure the power of said collimated light beam emitted by said light source, said optical detector surface being a planar optical waveguide in which photoluminescent particles are integrated and on which there is fitted at least one photoelectric sensor on a position along the longitudinal direction of said planar optical waveguide spaced apart from both end faces of said waveguide, said photoelectric sensor being capable of decoupling light from the waveguide mode, and thereby of generating an electrical signal whose intensity is a function of the power of the decoupled light a data processing system which computes from the temporal profile of the electrical signal of said optical detector surface and the temporal profile of the direction of the light beam the shadow boundaries on the optical detector surface and thus the position and size of at least one shading object in the plane of the area to be monitored.

2. The light curtain as claimed in claim 1, wherein said collimated light beam being swept in the plane of the area to be monitored by means of electro-optical elements which are changing the direction of the collimated light beam and which direct the collimated light beam on a mirror with a curved surface, said mirror increasing the initial angular change of the impinging light beam.

3. The light curtain as claimed in claim 1, wherein said collimated light beam being swept in the plane of an area to be monitored by means of a mirror onto which the light beam of the laser light source is directed and which can be driven by a drive to rotate uniformly.

4. The light curtain as claimed in claim 3, wherein the angular position of the drive and/or of the mirror can be measured at least once per revolution.

5. The light curtain as claimed in claim 3, wherein the rotating mirror is arranged at an edge of an area to be monitored, and in that during each rotation of the mirror the laser light source can be switched off in a definable angular segment of the position of the mirror and can be switched on again after traversing said segment.

6. The light curtain as claimed in claim 1, wherein a plurality of laser light sources, arranged spaced apart from one another, are arranged on the area to be monitored, and in that the laser light sources can be switched off individually by a control whenever they would shine onto a detector surface onto which another laser light source is already shining.

7. The light curtain as claimed in claim 1, wherein the area to be monitored is arranged horizontally above a floor area, and movements of persons or objects on the floor area are monitored by the light curtain.

8. The light curtain as claimed in claim 7, wherein changes in the position of sports players on a playing field are tracked thereby.

9. The light curtain as claimed in claim 1, wherein monitoring tasks in and/or on machines are carried out thereby.

10. The light curtain as claimed in claim 1, wherein it is used as measuring element in a controlled system for the movement of an object.

11. The light curtain as claimed in claim 1, wherein it is used as an input unit to a data processing system, for which purpose the area to be monitored is arranged above an display device which can be tapped by a finger or a stylus or a comparable object through the area to be monitored for the purpose of input to the data processing system.

12. The light curtain according to claim 1, wherein a plurality of photoelectric sensors are fitted on a plurality of positions on the planar optical waveguide said positions being located space apart from one another along the longitudinal direction of said planar optical waveguide, therefore the plurality of photoelectric sensor are located spaced apart along the edge of the area to be monitored.

13. The light curtain as claimed in claim 12, wherein a plurality of photoelectric sensors of the optical detector surface read out the electric sum signal, which can be fed to the data processing system.

14. The light curtain as claimed in claim 13, wherein a plurality of photoelectric sensors of the optical detector surface are connected in parallel with one another on common connecting leads.

15. The light curtain as claimed in claim 1, wherein said collimated light beam being swept in the plane of an area to be monitored by means of a first mirror whose position can be varied by the reverse piezoelectric effect thus changing the direction of the collimated light beam and which directs the collimated light beam on a second mirror with a curved surface, said second mirror increasing the initial angular change of the impinging light beam.

16. A light curtain for the optical detection of shading objects in an area to be monitored comprising
multiple light sources that emit collimated light beams, each light beam being swept in the plane of an area to be monitored,
multiple optical detector surfaces, each arranged along an edge of the area to be monitored and each optical detector surface can measure the power of said collimated light beams emitted by said light sources when impinging on said optical detector surface, each of said optical detector surface being a planar optical waveguide in which photoluminescent particles are integrated and on which there is fitted at least one photoelectric sensor on a position along the longitudinal direction of said planar optical waveguide spaced apart from both end faces of said waveguide, said photoelectric sensor being capable of decoupling light from the waveguide mode, and thereby generating an electrical signal whose intensity is a function of the power of the decoupled light,
a data processing system which computes from the temporal profiles of the electrical signals of said optical detector surfaces and the temporal profile of the direction of the light beams the shadow boundaries on the optical detector surfaces and thus the position and size of at least one shading object in the plane of the area to be monitored.

17. The light curtain according to claim 16, wherein a plurality of photoelectric sensor are fitted on a plurality of positions on each planar optical waveguide said positions being located space apart from one another along the longitudinal direction of said planar optical waveguide, therefore the plurality of photoelectric sensor are located spaced apart along the edge of the area to be monitored.

18. The light curtain according to claim 16, wherein the area to be monitored is rectangular and said multiple optical detector surfaces are located along each edge of the area to be monitored.

\* \* \* \* \*

UNITED STATES PATENT AND TRADEMARK OFFICE
CERTIFICATE OF CORRECTION

Page 1 of 2

PATENT NO.        : 9,075,156 B2
APPLICATION NO.   : 13/824808
DATED             : July 7, 2015
INVENTOR(S)       : Robert Koeppe et al.

It is certified that error appears in the above-identified patent and that said Letters Patent is hereby corrected as shown below:

In the claims

Column 6, Line 33, Claim 1:

After "decoupled light"
Insert -- of --.

Column 7, Line 13, Claim 11:

After "arranged above"
Delete "an" and
Insert -- a --.

Column 7, Line 19, Claim 12:

After "being located"
Delete "space" and
Insert -- spaced --.

Column 7, Line 22, Claim 12:

After "plurality of photoelectric"
Delete "sensor" and
Insert -- sensors --.

Signed and Sealed this
Thirteenth Day of October, 2015

Michelle K. Lee
*Director of the United States Patent and Trademark Office*

CERTIFICATE OF CORRECTION (continued)
U.S. Pat. No. 9,075,156 B2

Column 8, Line 28, Claim 17:

After "plurality of photoelectric"
Delete "sensor" and
Insert -- sensors --.

Column 8, Line 30, Claim 17:

After "being located"
Delete "space" and
Insert -- spaced --.

Column 8, Line 32, Claim 17:

After "plurality of photoelectric"
Delete "sensor" and
Insert -- sensors --.

UNITED STATES PATENT AND TRADEMARK OFFICE
CERTIFICATE OF CORRECTION

Page 1 of 2

PATENT NO.        : 9,075,156 B2
APPLICATION NO.   : 13/824808
DATED             : July 7, 2015
INVENTOR(S)       : Robert Koeppe et al.

It is certified that error appears in the above-identified patent and that said Letters Patent is hereby corrected as shown below:

Column 7, Line 13, Claim 11:

After "arranged above"
Delete "an" and
Insert -- a --.

Column 7, Line 19, Claim 12:

After "being located"
Delete "space" and
Insert -- spaced --.

Column 7, Line 22, Claim 12:

After "plurality of photoelectric"
Delete "sensor" and
Insert -- sensors --.

Column 8, Line 28, Claim 17:

After "plurality of photoelectric"
Delete "sensor" and
Insert -- sensors --.

This certificate supersedes the Certificate of Correction issued October 13, 2015.

Signed and Sealed this
Second Day of February, 2016

Michelle K. Lee
*Director of the United States Patent and Trademark Office*

CERTIFICATE OF CORRECTION (continued)
U.S. Pat. No. 9,075,156 B2

Column 8, Line 30, Claim 17:

After "being located"
Delete "space" and
Insert -- spaced --.

Column 8, Line 32, Claim 17:

After "plurality of photoelectric"
Delete "sensor" and
Insert -- sensors --.